(12) United States Patent
Hosotani

(10) Patent No.: US 11,114,950 B2
(45) Date of Patent: Sep. 7, 2021

(54) HIGH FREQUENCY POWER SUPPLY DEVICE

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 16/712,399

(22) Filed: Dec. 12, 2019

(65) Prior Publication Data

US 2020/0119661 A1 Apr. 16, 2020

Related U.S. Application Data

(63) Continuation of application No. PCT/JP2018/023400, filed on Jun. 20, 2018.

(30) Foreign Application Priority Data

Jun. 22, 2017 (JP) .............................. JP2017-121856

(51) Int. Cl.
*H02M 7/5387* (2007.01)
*H02J 50/12* (2016.01)
(Continued)

(52) U.S. Cl.
CPC ........... *H02M 7/5387* (2013.01); *H02J 50/12* (2016.02); *H02M 1/12* (2013.01); *H02M 1/007* (2021.05)

(58) Field of Classification Search
CPC ................. H02M 7/5387; H02M 1/12; H02M 2001/007; H02J 50/12
(Continued)

(56) References Cited

U.S. PATENT DOCUMENTS

2012/0125674 A1* 5/2012 Miyahara ............... H01G 11/04
174/260
2013/0277800 A1* 10/2013 Hori ........................ H01G 4/40
257/532

FOREIGN PATENT DOCUMENTS

JP 11027959 A * 1/1999 ......... H05K 7/20909
JP H11-027959 A 1/1999
(Continued)

OTHER PUBLICATIONS

International Search Report issued in PCT/JP2018/023400; dated Sep. 11, 2018.
(Continued)

*Primary Examiner* — Yemane Mehari
(74) *Attorney, Agent, or Firm* — Studebaker & Brackett PC

(57) ABSTRACT

A line length between an input end of a switching circuit and a high frequency capacitor is shorter than a line length between an output end of a DC power supply and the high frequency capacitor. A current path going through the switching circuit and the high frequency capacitor is the shortest among a plurality of current paths through which a switching current is caused to flow by switching at the switching circuit. Furthermore, the high frequency capacitor makes the ratio of time during which the voltage across the high-side switch element changes by a switching operation of the high-side switch element and the ratio of time during which the voltage across the low-side switch element changes by a switching operation of the low-side switch element the same, and thus reduces a harmonic wave current included in a current output from the high frequency power generation circuit.

20 Claims, 9 Drawing Sheets

(51) Int. Cl.
*H02M 1/12* (2006.01)
*H02M 1/00* (2006.01)

(58) Field of Classification Search
USPC .......................................................... 363/16
See application file for complete search history.

(56) References Cited

FOREIGN PATENT DOCUMENTS

| | | |
|---|---|---|
| JP | 2000-082630 A | 3/2000 |
| JP | 2001-103685 A | 4/2001 |
| JP | 2010-233354 A | 10/2010 |
| JP | 2010-272591 A | 12/2010 |
| JP | 2012-244635 A | 12/2012 |
| JP | 2013-222950 A | 10/2013 |
| JP | 2016-019425 A | 2/2016 |
| WO | 2012/101905 A1 | 8/2012 |

OTHER PUBLICATIONS

International Preliminary Report on Patentability and Written Opinion issued in PCT/JP2018/023400; dated Dec. 24, 2019.
Notice of Reasons for Refusal issued to JP Application No. 2019-525652, dated Nov. 19, 2019.

\* cited by examiner

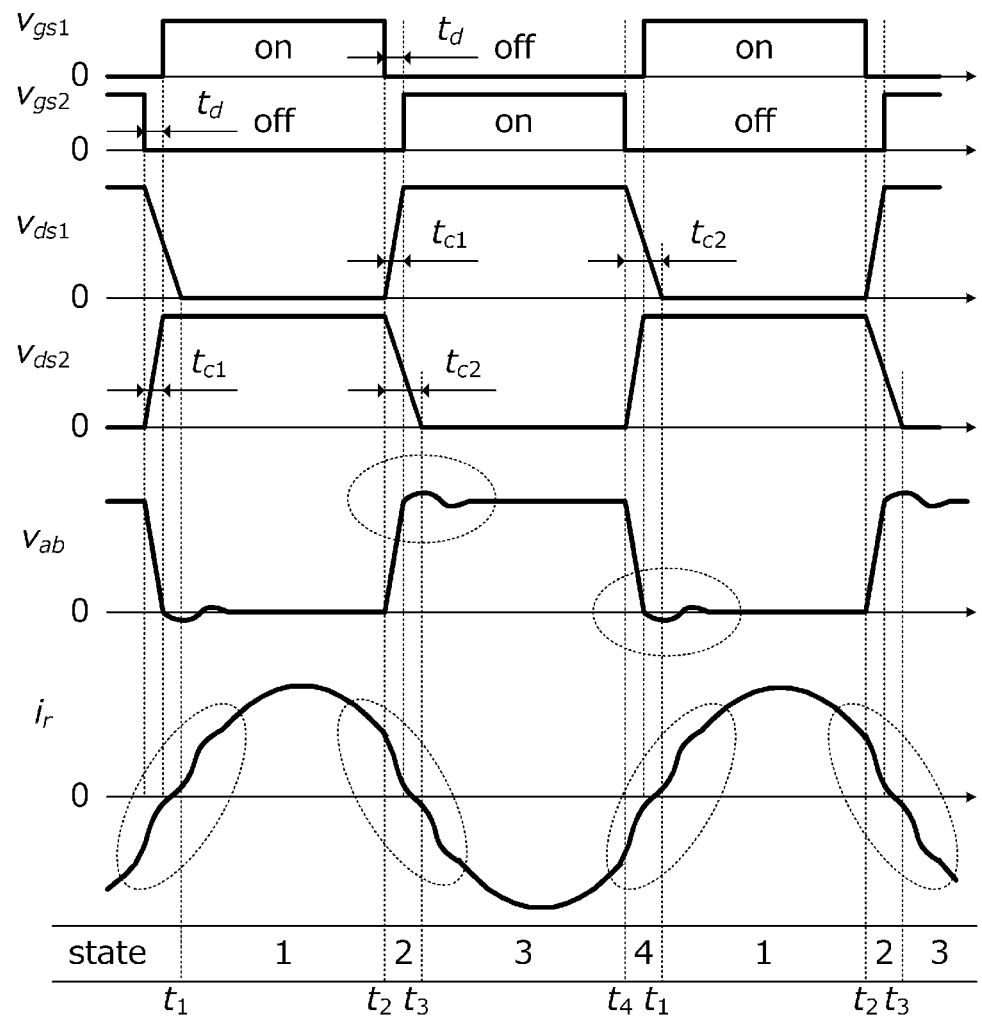

HIGH FREQUENCY POWER SUPPLY DEVICE

CROSS-REFERENCE TO RELATED APPLICATIONS

This application claims benefit of priority to International Patent Application No. PCT/JP2018/023400, filed Jun. 20, 2018, and to Japanese Patent Application No. 2017-121856, filed Jun. 22, 2017, the entire contents of each are incorporated herein by reference.

BACKGROUND

Technical Field

The present disclosure relates to a high frequency power supply device that includes a high frequency power generation circuit connected to a DC power supply and generating high frequency power using a switching circuit allowing a switch element to be switched at a high frequency.

Background Art

A power supply device that is connected to a DC power supply, converts the DC power supply into high frequency power using a switch element, and supplies power via the high frequency power is used for, for example, a wireless power transfer system, a POL (Point of Load) converter, and the like.

For example, in WO 2012/101905, a power supply device that includes a DC power supply and a high frequency power generation circuit that is connected to the DC power supply and includes a switching circuit including a high-side switch element and a low-side switch element, is illustrated.

SUMMARY

In a high frequency power generation circuit in a high frequency power supply device that receives DC power supplied from a DC power supply and generates high frequency power, switching noise generated by high frequency switching of a switch element may return to the DC power supply side. In such a case, not only is the switching noise transmitted through wiring or a line but noise may also be emitted by a high frequency current flowing in wiring in a circuit within the power supply device. As a result, there arises a problem of such noise exerting a harmful influence on operation of a mounted electronic circuit or external electronic equipment. In particular, switching noise or a harmonic wave current that is once generated by high speed switching is difficult to decrease even using a filter including an electronic component or the like. Therefore, it is important to prevent or reduce generation of switching noise and a harmonic wave current in a generation source of the noise.

Accordingly, the present disclosure provides a high frequency power supply device that solves a problem of exerting a harmful influence on operation of a mounted electronic circuit or external electronic equipment by preventing or reducing, at a noise generation source, generation of noise caused by high speed switching of a switch element and reducing generation of switching noise and radiation noise.

(1) A high frequency power supply device according to the present disclosure is a high frequency power supply device that is configured using a circuit substrate, and includes an input unit for a DC power supply; a high frequency power generation circuit that is connected to the DC power supply and includes a switching circuit including a high-side switch element and a low-side switch element; and a high frequency capacitor that is connected in parallel between the DC power supply and the high frequency power generation circuit. A line length between an input end of the switching circuit and the high frequency capacitor is shorter than a line length between an output end of the DC power supply and the high frequency capacitor. A current path going through the switching circuit and the high frequency capacitor is the shortest among a plurality of current paths through which a switching current is caused to flow by switching at the switching circuit. The high frequency capacitor is directly connected, with a shortest distance, to a connecting part of one end of the high-side switch element at the circuit substrate and a connecting part of one end of the low-side switch element at the circuit substrate.

With the above configuration, a connecting loop formed by the high frequency capacitor, the high-side switch element, and the low-side switch element is short, and therefore, a path for a high frequency current is a small loop. Thus, generation of harmonic wave noise from a noise generation source is prevented in the high frequency power circuit, and noise can be reduced without radiation noise being generated. Furthermore, switching noise generated by switching of the switch element can be prevented from returning (spreading) to the DC power supply side. Accordingly, radiation noise generated from a connection line connecting the DC power supply to the high frequency power circuit can be reduced.

(2) A high frequency power supply device according to the present disclosure is a high frequency power supply device that is configured using a circuit substrate, and includes an input unit for a DC power supply; a high frequency power generation circuit that is connected to the DC power supply and includes a switching circuit including a high-side switch element and a low-side switch element; and a high frequency capacitor that is connected in parallel between the DC power supply and the high frequency power generation circuit. A line length between an input end of the switching circuit and the high frequency capacitor is shorter than a line length between an output end of the DC power supply and the high frequency capacitor. A current path going through the switching circuit and the high frequency capacitor is the shortest among a plurality of current paths through which a switching current is caused to flow by switching at the switching circuit. The high-side switch element and the low-side switch element are arranged at one main surface of the circuit substrate, and the high frequency capacitor is arranged at the other main surface of the circuit substrate. The high frequency capacitor is directly connected, with a shortest distance, to the high-side switch element and the low-side switch element through a plurality of vias formed at the circuit substrate.

With the above structure, the distance between the switching circuit and the high frequency capacitor can be easily shortened and easily mounted at the circuit substrate. Furthermore, a connecting loop formed by the high frequency capacitor, the high-side switch element, and the low-side switch element is the shortest, and therefore, a path loop for the high frequency current is the smallest. Thus, generation of noise from a noise generation source can be suppressed, and radiation noise can be effectively reduced. Furthermore, switching noise returning (spreading) to the DC power supply side can be effectively prevented, and radiation noise generated from a connection line connecting the DC power supply to the high frequency power circuit can be reduced.

(3) In (2), it is preferable that the high frequency power generation circuit be arranged at the circuit substrate such that the switching circuit and the high frequency capacitor overlap at least partially when the circuit substrate is viewed in plan. With this structure, the distance between the switching circuit and the high frequency capacitor can be shortened compared to the case where electronic components are arranged on the same plane.

(4) The high frequency capacitor makes a ratio of time during which a voltage across the high-side switch element changes by a switching operation of the high-side switch element and a ratio of time during which a voltage across the low-side switch element changes by a switching operation of the low-side switch element the same.

(5) It is preferable that the high frequency capacitor be a multilayer ceramic capacitor made of a temperature compensation material with no Curie point. Thus, advantages of characteristics of little dielectric loss and low equivalent series inductance (ESL) in a high frequency band can be utilized.

(6) It is preferable that the high frequency capacitor be a multilayer ceramic capacitor including a dielectric made of a low-strain material having a Curie point lower than a normal temperature and exhibiting a paraelectric phase at the normal temperature. Thus, with the use of the multilayer ceramic capacitor including a dielectric made of a low-strain material as the high frequency capacitor, a device with little generation of harmonic wave distortion caused by application of a high frequency signal can be configured.

(7) It is preferable that the high frequency power supply device further include a low frequency capacitor that is connected in parallel between the DC power supply and the high frequency power generation circuit and has a large capacitance for low frequencies compared to the high frequency capacitor. It is also preferable that the line length between the input end of the switching circuit and the high frequency capacitor be shorter than a line length between the input end of the switching circuit and the low frequency capacitor. With this configuration, a connecting loop formed by the high frequency capacitor, the high-side switch element, and the low-side switch element can be made short, radiation noise can be effectively reduced, and switching noise returning to the DC power supply side can be effectively prevented. In contrast, in the high-capacitance capacitor for low frequencies, the line length from the high-side switch element and the low-side switch element is relatively longer than that in the high frequency capacitor. However, this configuration exerts only a little adverse influence on formation operation of a path for a low frequency current.

(8) In (7), it is preferable that the high frequency capacitor have an equivalent series inductance smaller than that of the low frequency capacitor. Thus, radiation noise can be effectively reduced, and switching noise returning to the DC power supply side can be effectively prevented.

(9) In (7) or (8), it is preferable that the low frequency capacitor be a multilayer ceramic capacitor made of a high dielectric constant material having a Curie point higher than a normal temperature and exhibiting a ferroelectric phase at the normal temperature. Thus, with the use of a compact and high-capacitance capacitor at a working temperature range (normal temperature), miniaturization of the device can be achieved.

(10) It is preferable that the high frequency power supply device further include a battery that is connected in parallel between the DC power supply and the high frequency capacitor. It is also preferable that the line length between the input end of the switching circuit and the high frequency capacitor be shorter than a line length between the input end of the switching circuit and the battery. With this configuration, the power supply voltage to be applied to the high frequency power generation circuit can be backed up by the battery, and the power supply apparatus can be designed such that the acceptable range of fluctuations in the output voltage of the power supply can be set to be narrow.

(11) In (10), it is preferable that the battery be an all-solid-state battery. Thus, the energy density of the battery can be significantly increased, and a long life span can be achieved by ensuring reliability and safety compared to a lithium-ion battery or the like. Consequently, a compact and long-life power supply apparatus with a high reliability can be configured.

According to the present disclosure, a high frequency power supply device that includes a high frequency power generation circuit capable of reducing, at a noise generation source, noise generated by high-speed switching of a switch element to reduce radiation noise and not adversely affecting an operation of an electronic circuit mounted at the high frequency power supply device or external electronic equipment, can be obtained.

BRIEF DESCRIPTION OF THE DRAWINGS

FIG. 10 is a waveform chart of individual units of a power transmission device according to a comparative example.

DETAILED DESCRIPTION

Figure 1:
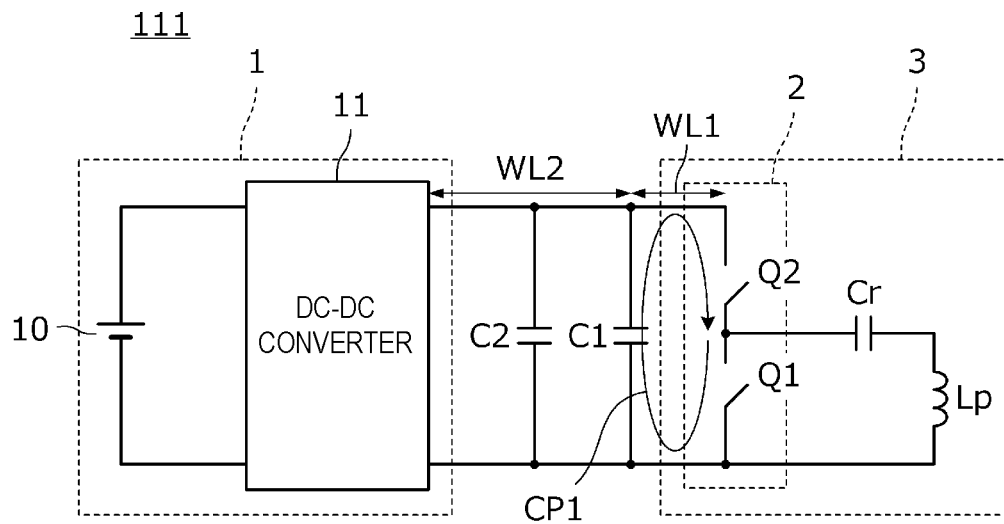
FIG. 1 is a circuit diagram of a high frequency power supply device according to a first embodiment.

Hereinafter, a plurality of embodiments of the present disclosure will be described with reference to drawings and several specific examples. In the drawings, the same parts will be referred to with the same signs. For explanation of main points and easier understanding, embodiments will be described separately for the convenience. However, partial replacement or combination of configurations described in different embodiments is possible. In a second embodiment and subsequent embodiments, description of matters common to those in a first embodiment will be omitted, and only different points will be described. In particular, similar operational effects with similar configurations will not be described in each embodiment.

First Embodiment

FIG. 1 is a circuit diagram of a high frequency power supply device 111 according to the first embodiment. The high frequency power supply device 111 is a power supplying device in a wireless power transfer system that includes a power transmission device and a power reception device. The high frequency power supply device 111 includes a DC power supply 1 and a high frequency power generation circuit 3 that is connected to the DC power supply 1 and generates high frequency power. The high frequency power generation circuit 3 includes a switching circuit 2 including a high-side switch element Q2 and a low-side switch element Q1, a power transmission coil Lp, and a resonant capacitor Cr. The power transmission coil Lp and the resonant capacitor Cr form a resonant circuit. The switch elements Q1 and Q2 are controlled by a switching control circuit, which is not illustrated in the drawing. The switch elements Q1 and Q2 are turned ON and turned OFF alternately with a dead time interposed therebetween by the switching control circuit. The switching frequency is equal to the resonant frequency of the resonant circuit mentioned above or a frequency close to the resonant frequency.

A high frequency capacitor C1 is connected in parallel between the DC power supply 1 and the high frequency power generation circuit 3. In this example, a low frequency capacitor C2 that is connected in parallel between the DC power supply 1 and the high frequency power generation circuit 3 is further provided. The low frequency capacitor C2 is a capacitor that has a large capacitance for low frequencies compared to the high frequency capacitor C1.

A line length WL1 between an input end of the switching circuit 2 and the high frequency capacitor C1 is shorter than a line length WL2 between an output end of the DC power supply 1 and the high frequency capacitor C1.

A current path CP1 in FIG. 1 represents, out of a plurality of current paths through which a switching current flows by switching at the switching circuit 2, a current path going through the switching circuit 2 and the high frequency capacitor C1. The current path CP1 is the shortest among all the current paths.

The high frequency capacitor C1 makes the ratio of time during which the voltage across the high-side switch element Q2 changes by a switching operation of the high-side switch element Q2 and the ratio of time during which the voltage across the low-side switch element Q1 changes by a switching operation of the low-side switch element Q1 the same. Operation of the high frequency capacitor C1 will be described in detail later. Accordingly, harmonic wave current included in current output from the high frequency power generation circuit 3 is reduced.

The DC power supply 1 includes a DC power supply 10 and a DC-DC converter 11 that receives the voltage of the DC power supply 10 and outputs a predetermined stabilized DC voltage. The switching frequency of the DC-DC converter 11 is lower than the switching frequencies of the switch elements Q1 and Q2.

Figure 9:
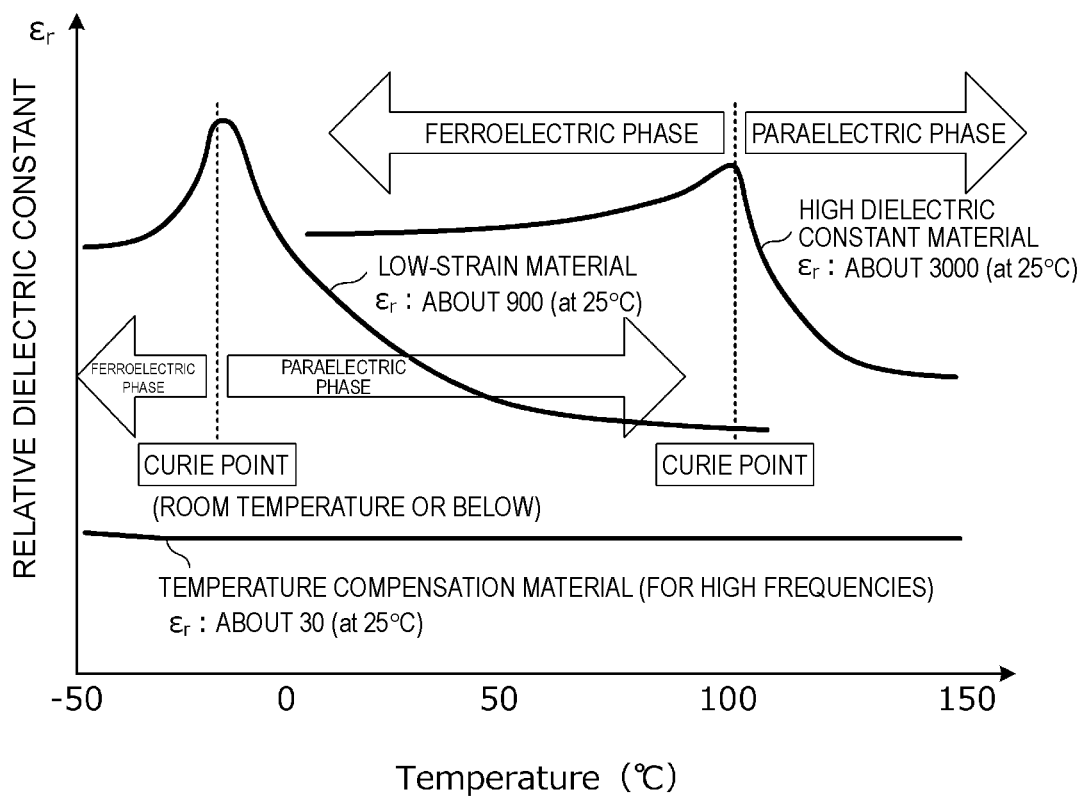
FIG. 9 is a diagram illustrating temperature dependence of a relative dielectric constant of each dielectric material used for each capacitor.

A dielectric material used for each capacitor will be described with reference to FIG. 9. In FIG. 9, a [high dielectric constant material] represents, for example, a ferroelectric-based dielectric material such as barium titanate ($BaTiO_3$) and has a relative dielectric constant of about 3,000 at 25 degrees Celsius. A Curie point of a high dielectric constant material (the critical point between the temperature at which the dielectric exhibits a paraelectric phase and the temperature at which the dielectric exhibits a ferroelectric phase) is higher than a room temperature. Furthermore, in FIG. 9, a [low-strain material] represents, for example, a reduction-resistant paraelectric material such as forsterite, aluminum oxide, barium magnesium niobite, or barium neodymium titanate and has a relative dielectric constant of about 900 at 25 degrees Celsius. The Curie point of this low-strain material is lower than or equal to a room temperature. Furthermore, in FIG. 9, a [temperature compensation material] represents, for example, a paraelectric material such as titanium oxide ($TiO_2$) or calcium zirconate ($CaZrO_3$) and has a relative dielectric constant of about 30 at 25 degrees Celsius. There is no Curie point in this temperature compensation material.

The high frequency capacitor C1 is a capacitor with a smaller equivalent series inductance (ESL) than that of the low frequency capacitor C2. For example, the high frequency capacitor C1 is a multilayer ceramic capacitor made of the above-mentioned temperature compensation material not having a Curie point. Multilayer ceramic capacitors made of such a temperature compensation material have a low voltage dependence and a low dielectric loss and are suitable for high frequency capacitors. Thus, advantages of characteristics of low dielectric loss and low equivalent series inductance (ESL) in a high frequency band can be utilized, radiation noise can be effectively reduced, and switching noise can be effectively prevented.

Alternatively, the high frequency capacitor C1 is a multilayer ceramic capacitor that includes a dielectric made of the above-mentioned low-strain material having a Curie point lower than a normal temperature and exhibiting a paraelectric phase at the normal temperature. Multilayer ceramic capacitors including a dielectric made of such a low-strain material have a low voltage dependence and a low dielectric loss and are suitable for medium to high pressure capacitors. As described above, with the use of a multilayer ceramic capacitor including a dielectric made of the low-strain material for the high frequency capacitor C1, a device with little harmonic wave distortion caused by application of a high frequency signal can be configured.

The low frequency capacitor C2 is a multilayer ceramic capacitor that is made of the above-mentioned high dielectric constant material having a Curie point higher than a normal temperature and exhibiting a ferroelectric phase at the normal temperature and includes a dielectric made of a material with a higher dielectric constant than that of the dielectric of the high frequency capacitor C1.

With the above-mentioned configuration, a connecting loop formed by the high frequency capacitor C1, the high-side switch element Q2, and the low-side switch element Q1 is short, and therefore, a path for high frequency current forms a small loop. Thus, generation of harmonic wave noise at the high frequency power circuit is prevented, and radiation noise can be reduced. Furthermore, switching noise generated by switching of the switch element is prevented from returning (spreading) to the DC power supply side.

Furthermore, the high frequency capacitor C1 is a capacitor having an equivalent series inductance smaller than that of the low frequency capacitor C2. Therefore, radiation noise can be effectively reduced, and switching noise returning (spreading) to the DC power supply side can be effectively prevented.

Furthermore, in the case where the high frequency capacitor C1 is a multilayer ceramic capacitor made of a temperature compensation material with no Curie point, advantages of characteristics of little dielectric loss and little equivalent series inductance (ESL) in a high frequency band can be utilized.

Furthermore, in the case where the low frequency capacitor C2 is a multilayer ceramic capacitor made of a high dielectric constant material having a Curie point higher than a normal temperature and exhibiting a ferroelectric phase at the normal temperature, advantages of characteristics of a small size and a large capacitance in a working temperature range (normal temperature) can be utilized, and miniaturization of a device can be achieved.

Furthermore, in the case where the high frequency capacitor C1 is a multilayer ceramic capacitor having a Curie point lower than a normal temperature and including a dielectric made of a low-strain material, a device with little generation of harmonic wave distortion caused by application of a high frequency signal can be configured.

Figure 2:
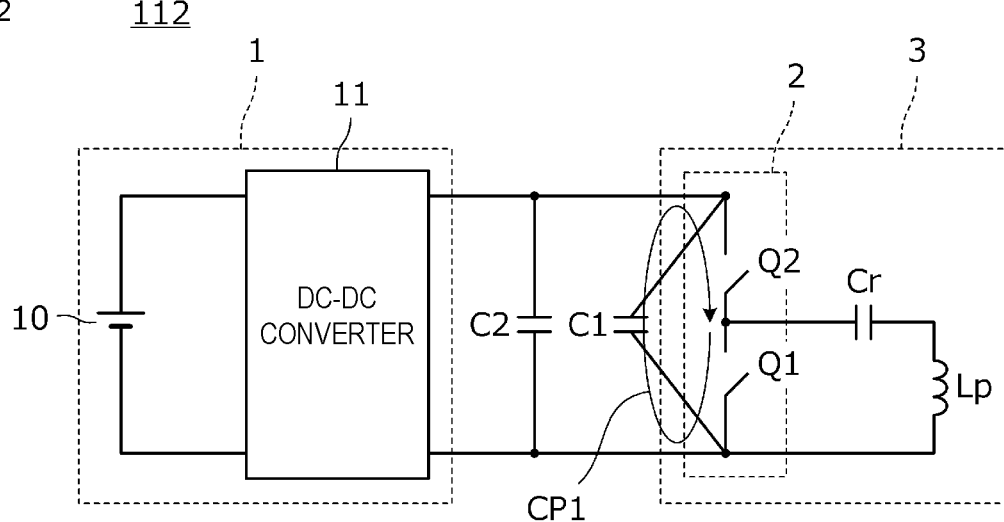
FIG. 2 is a circuit diagram of another high frequency power supply device according to the first embodiment.

FIG. 2 is a circuit diagram of another high frequency power supply device 112 according to this embodiment. The high frequency power supply device 112 is different from the high frequency power supply device 111 illustrated in FIG. 1 in the connection structure of the high frequency capacitor C1. In this example, the high frequency capacitor C1 is directly connected to the high-side switch element Q2 and the low-side switch element Q1 with substantially no wiring interposed therebetween. Accordingly, a connecting loop formed by the high frequency capacitor C1, the high-side switch element Q2, and the low-side switch element Q1 is the shortest, and a path for a high frequency current forms the smallest loop. Thus, radiation noise can be effectively reduced, and switching noise returning (spreading) to the DC power supply side can be effectively prevented.

Second Embodiment

In a second embodiment, a more specific circuit configuration and operation of a switching circuit will be described.

Figure 3:
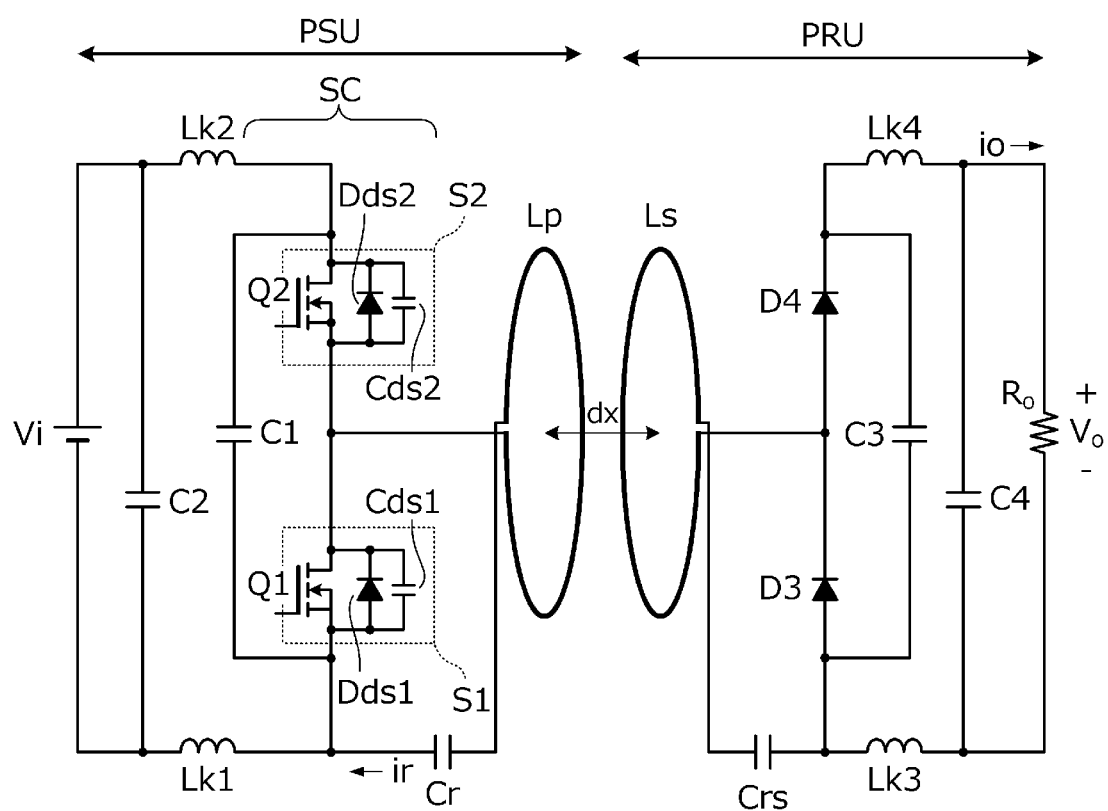
FIG. 3 is a circuit diagram of a power transfer system that includes a high frequency power supply device according to a second embodiment.

FIG. 3 is a circuit diagram of a power transfer system 120 that includes a high frequency power supply device according to the second embodiment.

The power transfer system 120 includes a power transmission device PSU and a power reception device PRU. The power transmission device PSU is an example of a "high frequency power supply device" according to the present disclosure.

The power transfer system 120 is a system in which the power transmission device PSU supplies stable DC energy to the power reception device PRU.

The power transmission device PSU includes a DC power supply Vi and a switching circuit SC that is connected to the DC power supply Vi and generates high frequency power. The switching circuit SC is an example of a "high frequency power generation circuit" according to the present disclosure.

The switching circuit SC includes a high-side switch circuit S2 and a low-side switch circuit S1. The high-side switch circuit S2 includes the high-side switch element Q2, a diode Dds2 that is connected at both ends of the high-side switch element Q2, and a capacitor Cds2. In a similar manner, the low-side switch circuit S1 includes the low-side switch element Q1, a diode Dds1 that is connected at both ends of the low-side switch element Q1, and a capacitor Cds1.

A series circuit including a power transmission coil Lp and a resonant capacitor Cr is connected between the ground and a connecting point between the high-side switch circuit S2 and the low-side switch circuit S1. The power transmission coil Lp and the resonant capacitor Cr form a resonant circuit. A switching control circuit, which is not illustrated in the drawing, is connected to gates of the switch elements Q1 and Q2. The switching frequencies of the switch elements Q1 and Q2 are equal to the resonant frequency of the resonant circuit or a frequency close to the resonant frequency.

In this embodiment, the high-side switch element Q2 is an FET, the diode Dds2 is a body diode of the high-side switch element Q2, and the capacitor Cds2 is a parasitic capacitor between the drain and source of the high-side switch element Q2. In a similar manner, the low-side switch element Q1 is an FET, the diode Dds1 is a body diode of the low-side switch element Q1, and the capacitor Cds1 is a parasitic capacitor between the drain and source of the low-side switch element Q1.

In FIG. 3, inductances generated in a wiring part from the DC power supply Vi to the switching circuit SC are represented by inductors Lk1 and Lk2.

In contrast, the power reception device PRU includes a power reception coil Ls, a resonant capacitor Crs, rectifier diodes D3 and D4, a high frequency capacitor C3, and a low frequency capacitor (smoothing capacitor) C4. The power reception device PRU is configured to supply DC power to a load Ro. In FIG. 3, inductances generated in a wiring part from the rectifier diodes D3 and D4 to the load Ro are represented by inductors Lk3 and Lk4.

The power reception coil Ls is arranged separately from the power transmission coil Lp with a distance dx therebetween, and the power reception coil Ls and the power transmission coil Lp are magnetically coupled to each other. By alternately turning ON and turning OFF the high-side switch element Q2 and the low-side switch element Q1 of the power transmission device PSU, high frequency power is generated and transferred to the power reception device PRU through magnetic coupling between the power transmission coil Lp and the power reception coil Ls.

The power reception device PRU rectifies and smooths high frequency voltage by resonance between the power reception coil Ls and the resonant capacitor Crs, and supplies DC power to the load Ro.

Figure 4:
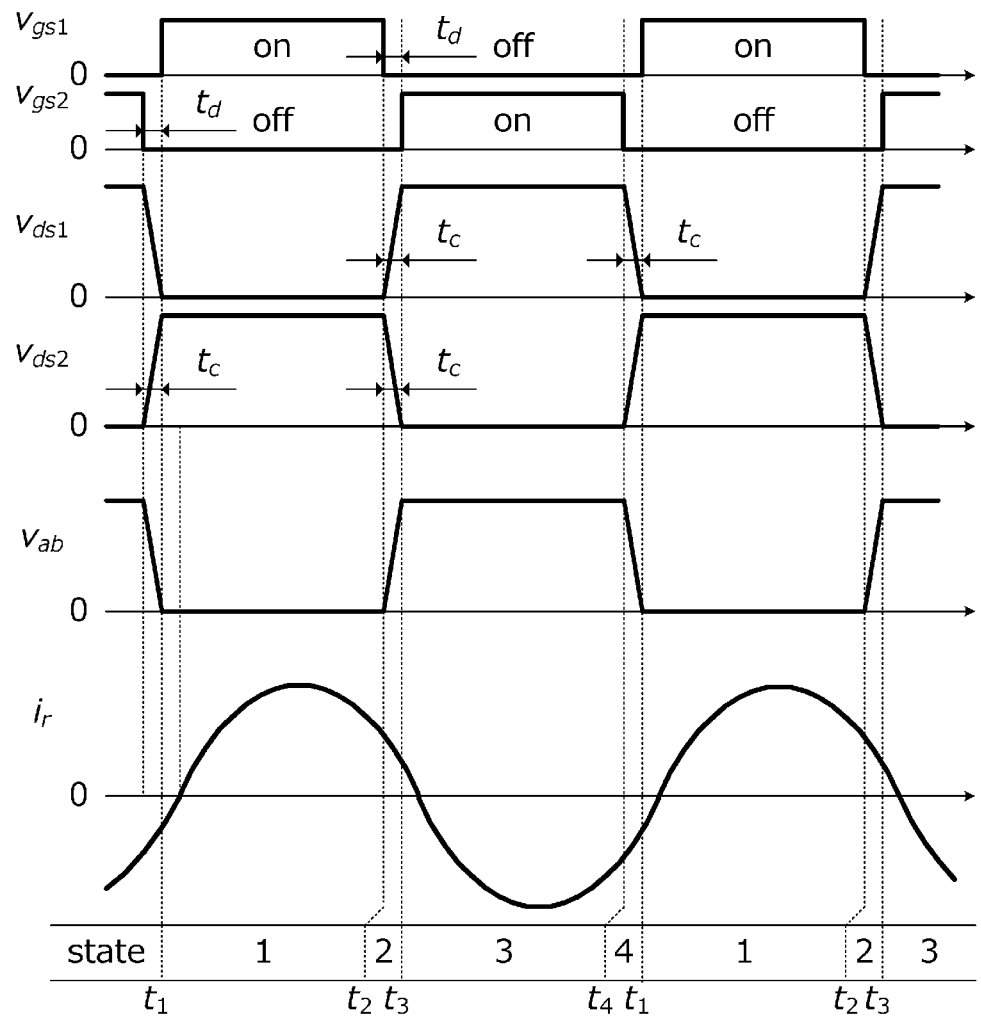
FIG. 4 is a waveform chart of individual units of a power transmission device illustrated in FIG. 3.

FIG. 4 is a waveform chart of individual units of the power transmission device PSU illustrated in FIG. 3.

In FIG. 4, the voltage between the gate and source of the switch element Q1 and the voltage between the gate and source of the high-side switch element Q2 are represented by Vgs1 and Vgs2, respectively, and the voltage between the drain and source of the low-side switch element Q1 and the voltage between the drain and source of the high-side switch element Q2 are represented by Vds1 and Vds2, respectively. Furthermore, the voltage at the connecting point between the high-side switch circuit S2 and the low-side switch circuit S1 is represented by Vab, and the current flowing in the power transmission coil Lp is represented by ir.

The switch elements Q1 and Q2 are alternately turned ON and turned OFF with a short dead time td, in which both the switch elements are OFF, interposed therebetween, so that currents flowing in Q1 and Q2 are commutated during the dead time period and a ZVS operation is thus performed. Operation in individual states during a switching period will be described below.

(1) State 1: Time t1 to Time t2

First, the diode Dds1 is electrically connected. During a conduction period of the diode Dds1, turning ON of the switch element Q1 allows a ZVS operation to be performed, thus the switch element Q1 being electrically connected.

After that, the switch element Q1 is turned OFF, and a state 2 is entered.

(2) State 2: Time t2 to Time t3

The parasitic capacitor Cds1 is charged, and the parasitic capacitor Cds2 is discharged. When the voltage Vds1 reaches the voltage Vi of the DC power supply Vi and the voltage Vds2 reaches 0 V, the diode Dds2 is electrically connected, and a state 3 is entered. That is, after Vgs1 drops to "L" and the dead time td passes, Vgs2 rises to "H".

(3) State 3: Time t3 to Time t4

During a conduction period of the diode Dds2, turning ON of the switch element Q2 allows a ZVS operation to be performed, and the switch element Q2 is electrically connected.

After that, the switch element Q2 is turned OFF, and a state 4 is entered.

(4) State 4: Time t4 to t1

The parasitic capacitor Cds1 is discharged, and the parasitic capacitor Cds2 is charged. When the voltage Vds1 reaches 0 V and the voltage Vds2 reaches Vi, the diode Dds1 is electrically connected, and the state 1 is entered again.

The above-mentioned states 1 to 4 are repeated periodically.

In FIG. 3, the high frequency capacitor C1 allows different potentials of the capacitor Cds1 of the low-side switch element Q1 and the capacitor Cds2 of the high-side switch element Q2 to be connected. Therefore, charges charged in and discharged from the capacitors Cds1 and Cds2 are balanced with the high frequency capacitor C1 interposed therebetween. As a result, the ratio of time during which the voltage across the capacitor Cds1 changes and the ratio of time during which the voltage across the capacitor Cds2 changes become the same, thereby generation of a harmonic wave current being prevented. This operation is caused by a configuration in which the high frequency capacitor C1 is connected at a position closer to the switching circuit SC than to wiring inductances indicated by the inductors Lk1 and Lk2 in FIG. 3. Thus, harmonic wave current included in current output from the high frequency power generation circuit can be reduced.

A waveform chart of individual units of a power transfer device in which the above-mentioned high frequency capacitor C1 is connected to a side farther away than the above-mentioned wiring inductances (inductors Lk1 and Lk2) (a side closer to the DC power supply Vi) or a power transmission device that does not include the high frequency capacitor C1, is illustrated in FIG. 10. This waveform chart is a diagram illustrated corresponding to the waveform chart illustrated in FIG. 4. In the case where the high frequency capacitor C1 is arranged at a position far away from the switching circuit SC, adverse influence of an inductance such as wiring causes a difference in charge and discharge currents between the capacitors Cds1 and Cds2. Thus, a difference appears in voltage change, and the ratio of time during which the voltage across the capacitor Cds1 changes (a rise time during a half period and a fall time during a half period) and the ratio of time during which the voltage across the capacitor Cds2 changes (a rise time during a half period and a fall time during a half period) are unbalanced.

In the example illustrated in FIG. 10, a turn-OFF time tc1 and a turn-ON time tc2 are different between the switch elements Q1 and Q2, and a rising slope and a falling slope are different between Vds1 and Vds2. As a result, as illustrated in FIG. 10, a voltage disturbance occurs immediately after rising of the voltage Vab and immediately after falling of the voltage Vab. Moreover, in accordance with the disturbance, the current ir flowing in the power transmission coil Lp exhibits a waveform distorted relative to a sine wave form.

In contrast, according to this embodiment, due to the high frequency capacitor C1, a current that compensates the difference with respect to charge and discharge currents flows from the capacitor Cds1 to the capacitor Cds2, or other way round, from the capacitor Cds2 to the capacitor Cds1. Accordingly, as illustrated in FIG. 4, the turn-OFF time tc and the turn-ON time tc are the same between the switch elements Q1 and Q2, the ratio of time during which the voltage Vds1 across the switch element Q1 changes and the ratio of time during which the voltage Vds2 across the switch element Q2 changes become the same, and a change in the voltage Vds1 and a change in the voltage Vds2 are balanced. That is, the voltage Vds1 and the voltage Vds2 exhibit a periodical trapezoidal wave form with no distortion, no overshoot, or no undershoot. As a result, harmonic wave components of the resonant current ir can be reduced at a noise generation source. Consequently, radiation noise and power loss by harmonic wave current can be significantly reduced.

Third Embodiment

In a third embodiment, a configuration of a high frequency power supply device at a circuit substrate, in particular, a mounting structure of a switch element and a high frequency capacitor, will be described.

Figure 5A:
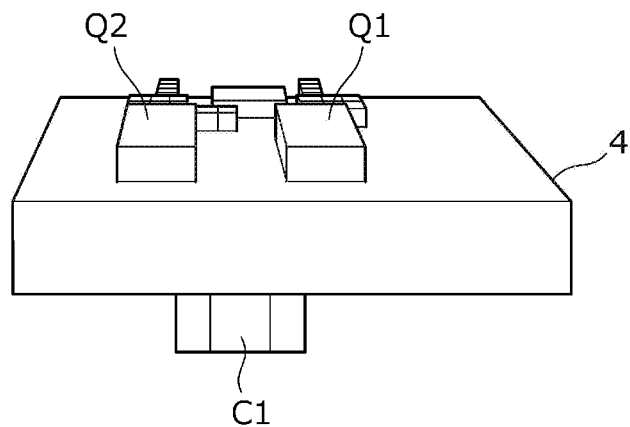
FIGS. 5A, 5B, 5C, and 5D are diagrams each illustrating a structure of a high frequency power supply device according to a third embodiment, in particular, mounting of a switch element and a high frequency capacitor at a circuit substrate.
Figure 5B:
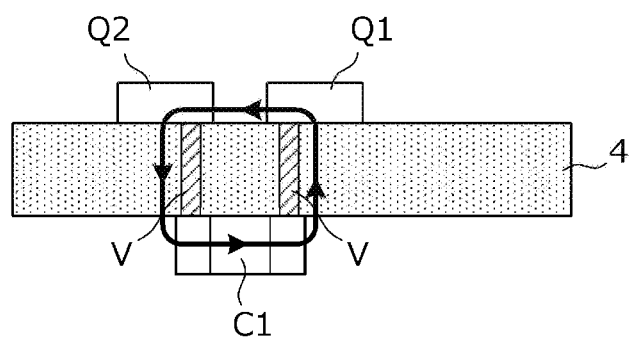
Figure 5C:
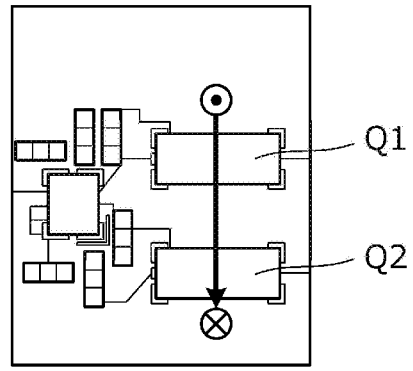
Figure 5D:
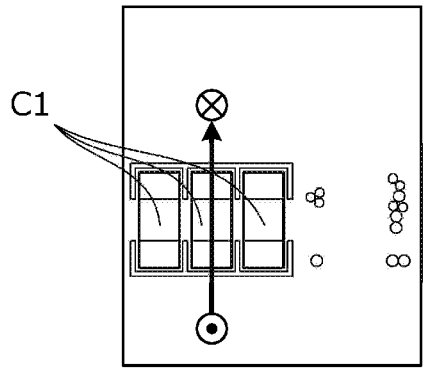

FIGS. 5A, 5B, 5C, and 5D are diagrams illustrating a mounting structure of a high frequency power supply device according to the third embodiment, in particular, a switch element and a high frequency capacitor at a circuit substrate. FIG. 5A is a perspective view viewed from a side of a circuit substrate 4 at which the high frequency capacitor C1, the high-side switch element Q2, and the low-side switch element Q1 are mounted. FIG. 5B is a cross-sectional view of the circuit substrate 4, FIG. 5C is a plan view of the circuit substrate 4, and FIG. 5D is a bottom view of the circuit substrate 4.

A circuit of the high frequency power supply device is configured as described in the first and second embodiments, and is formed at the circuit substrate 4. The high frequency capacitor C1 includes three capacitors that are connected in parallel to one another, and the three capacitors are mounted at the bottom surface of the circuit substrate 4. The high-side switch element Q2 and the low-side switch element Q1 are mounted at the top surface of the circuit substrate 4. The high frequency capacitor C1, the high-side switch element Q2, and the low-side switch element Q1 are arranged overlapping at the circuit substrate 4 when viewed in plan. The drain of the high-side switch element Q2 is directly connected to one end of the high frequency capacitor C1 through a via V formed at the circuit substrate 4, and the source of the low-side switch element Q1 is connected to the other end of the high frequency capacitor C1 through the via V formed at the circuit substrate 4. That is, the high frequency capacitor C1 is arranged at one main surface of the circuit substrate 4, the high-side switch element Q2 and the low-side switch element Q1 are arranged at the other main surface of the circuit substrate 4, and the high frequency capacitor C1 is directly connected to the high-side switch element Q2 and the low-side switch element Q1 through the via formed at the circuit substrate 4.

In each of FIGS. 5B, 5C, and 5D, an arrow conceptually represents a path for a current flowing in a connecting loop formed by the high frequency capacitor C1, the high-side switch element Q2, and the low-side switch element Q1.

As described above, with a configuration in which the high-side switch element Q2 and the low-side switch element Q1 are mounted at one main surface of the circuit substrate 4 and the high frequency capacitor C1 is mounted at the other main surface of the circuit substrate 4 and in which the high frequency capacitor C1, the high-side switch element Q2, and the low-side switch element Q1 overlap at least partially when the circuit substrate 4 is viewed in plan, the path for a current flowing through a connecting loop formed by the high frequency capacitor C1, the high-side switch element Q2, and the low-side switch element Q1 is extremely shortened.

Furthermore, according to this embodiment, a loop surface of the connecting loop formed by the high frequency capacitor C1, the high-side switch element Q2, and the low-side switch element Q1 faces the plane direction of the circuit substrate 4 (laterally), and are therefore difficult to be magnetically coupled with other components mounted at the circuit substrate 4. That is, the direction of a magnetic flux is laterally parallel to the circuit substrate 4. Therefore, a magnetic field exerts little influence on components. Thus, there is less propagation or radiation of noise by unwanted coupling.

The high frequency capacitor C1 is not necessarily mounted at a surface of the circuit substrate. For example, the circuit substrate 4 may be configured as a multilayer substrate, and the high frequency capacitor may be formed inside the multilayer substrate.

Fourth Embodiment

In a fourth embodiment, a configuration of a high frequency power supply device at a circuit substrate, in particular, a mounting structure of a switch element and a high frequency capacitor, which is different from the third embodiment, will be illustrated.

Figure 6:
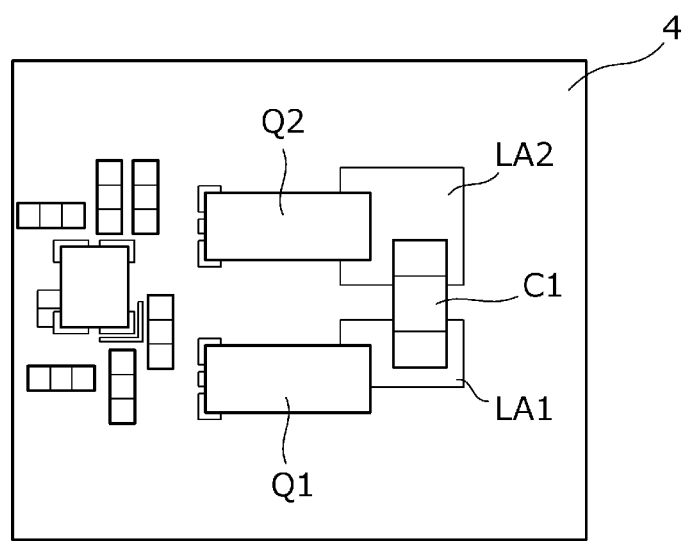
FIG. 6 is a diagram illustrating a structure of a high frequency power supply device according to a fourth embodiment, in particular, mounting of a switch element and a high frequency capacitor at a circuit substrate.

FIG. 6 is a plan view illustrating a mounting structure of a high frequency power supply device according to the fourth embodiment, in particular, a switch element and a high frequency capacitor at a circuit substrate.

A circuit of a high frequency power supply device is configured as described in the first and second embodiments and is formed at the circuit substrate 4. The high-side switch element Q2, the low-side switch element Q1, and the high frequency capacitor C1 are surface-mounted at the top surface of the circuit substrate 4. One end of the high frequency capacitor C1 is connected to a land LA2 to which the drain of the high-side switch element Q2 is connected, and the other end of the high frequency capacitor C1 is connected to a land LA1 to which the source of the low-side switch element Q1 is connected. That is, the high frequency capacitor C1 is directly connected to a connecting part of one end of the high-side switch element Q2 on the circuit substrate 4 and a connecting part of one end of the low-side switch element Q1 on the circuit substrate 4.

As described above, the high frequency capacitor C1, as well as the switch elements Q1 and Q2, may be mounted at one face of the circuit substrate 6.

Fifth Embodiment

In a fifth embodiment, an example of a high frequency power supply device that includes a battery will be described.

Figure 7:
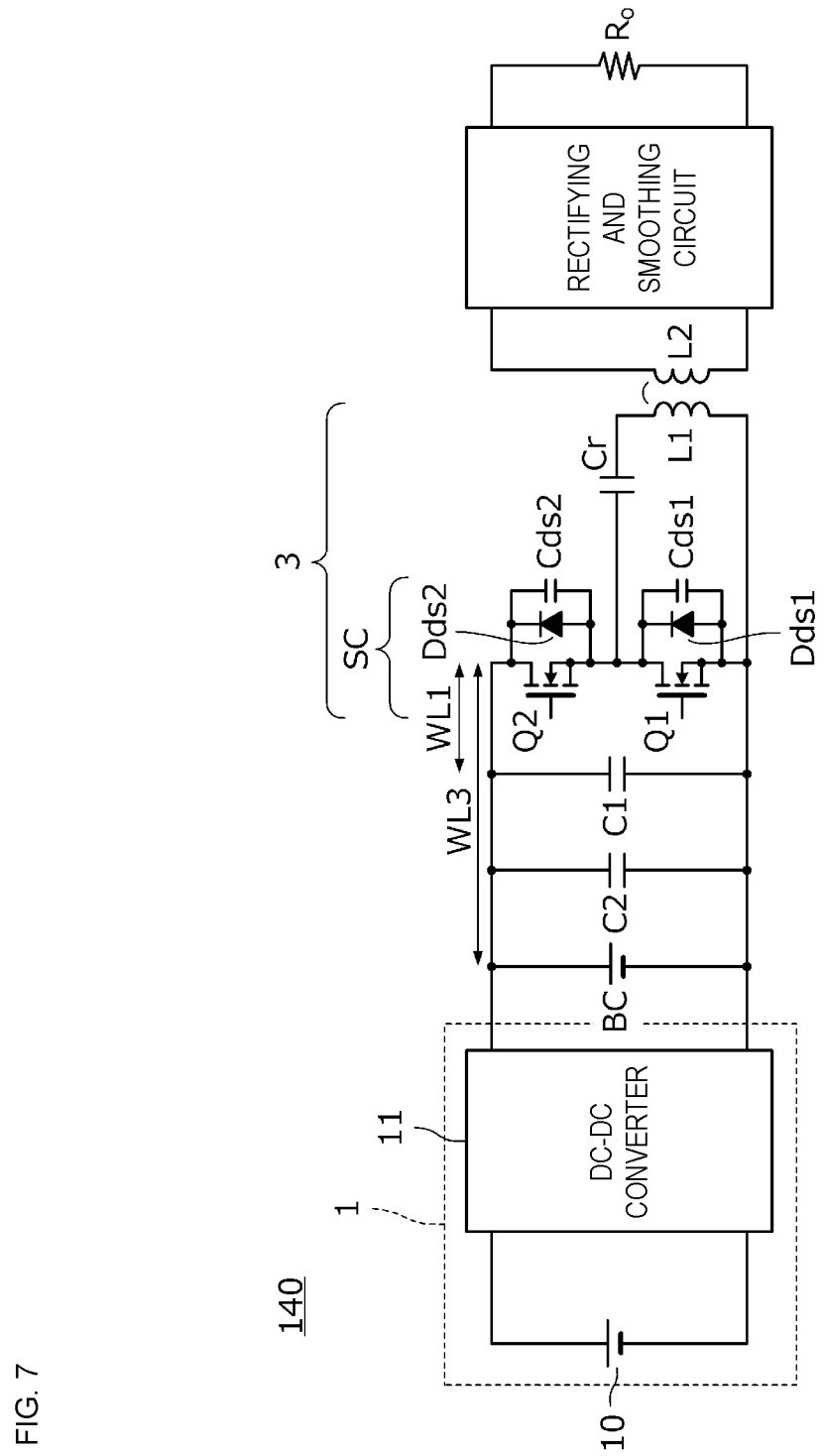
FIG. 7 is a circuit diagram of a power supply apparatus that includes a high frequency power supply device according to a fifth embodiment.

FIG. 7 is a circuit diagram of a power supply apparatus 140 that includes the high frequency power supply device according to the fifth embodiment.

The power supply apparatus 140 includes the DC power supply 1 and the high frequency power generation circuit 3 that is connected to the DC power supply 1 and generates high frequency power. The high frequency power generation circuit 3 includes the switching circuit SC including the high-side switch element Q2 and the low-side switch element Q1, a transformer primary coil L1, and a resonant capacitor Cr. The switch elements Q1 and Q2 are controlled by a switching control circuit, which is not illustrated in the drawing.

The load Ro is connected to a transformer secondary coil L2 with a rectifying and smoothing circuit interposed therebetween.

The high frequency capacitor C1 is connected in parallel between the DC power supply 1 and the high frequency power generation circuit 3. Furthermore, a battery BC is connected in parallel between the DC power supply 1 and the high frequency power generation circuit 3. The battery BC is a solid-state battery that is surface-mounted at the circuit substrate. Furthermore, in this example, the low frequency capacitor C2 that is connected in parallel between the DC power supply 1 and the high frequency power generation circuit 3 is further provided. The low frequency capacitor C2 is, for example, a high-capacitance multilayer ceramic capacitor.

A line length WL1 between an input end of the switching circuit SC and the high frequency capacitor C1 is shorter than a line length WL3 between the input end of the switching circuit SC and the battery BC. The positional relationship of the high frequency capacitor C1 and the low frequency capacitor C2 is the same as that described in the first to fourth embodiments.

According to this embodiment, the power supply voltage to be applied to the high frequency power generation circuit 3 is stabilized by the battery BC. Furthermore, the voltage of the low frequency capacitor C2 is backed up by the battery BC. With these operations, the acceptable range of fluctuations in the output voltage of the power supply can be set to be narrow. For example, a high power integrity (quality of power supply voltage at a power supply layer of the circuit substrate or a power supply line) is required for an LSI that operates twenty-four hours. In this embodiment, fluctuations in the power supply voltage can be reduced to a narrow acceptable range. Furthermore, with the use of an all-solid-state battery, a compact and long-life power supply apparatus can be configured.

Sixth Embodiment

In a sixth embodiment, an example of a high frequency power supply device that includes a synchronous rectification buck converter is described.

Figure 8:
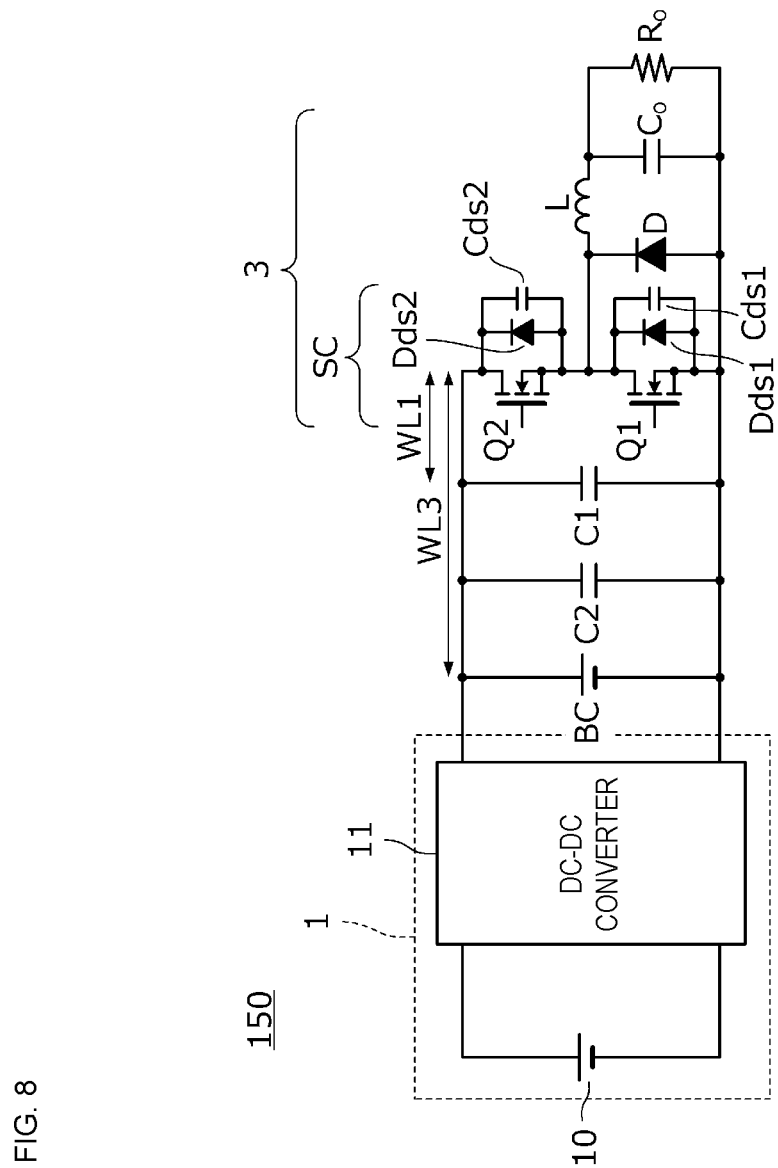
FIG. 8 is a circuit diagram of a power supply apparatus that includes a high frequency power supply device according to a sixth embodiment.

FIG. 8 is a circuit diagram of a power supply apparatus 150 that includes a high frequency power supply device according to the sixth embodiment.

The power supply apparatus 150 includes the DC power supply 1 and the high frequency power generation circuit 3 that is connected to the DC power supply 1 and generates high frequency power.

The DC power supply 1 includes the DC power supply 10 and the DC-DC converter 11 that receives the voltage of the DC power supply 10 and outputs a predetermined stabilized DC voltage. The DC-DC converter 11 includes a POL (Point of Load) converter.

The high frequency power generation circuit 3 includes the switching circuit SC including the high-side switch element Q2 and the low-side switch element Q1, a commutation diode D, an inductor L, and a smoothing capacitor Co. The high-side switch element Q2 operates as a rectification switch element, and the low-side switch element Q1 operates as a commutation switch element. That is, the high frequency power generation circuit 3 operates as a synchronous rectification buck converter and supplies DC power to the load Ro. The switch elements Q1 and Q2 are controlled by a switching control circuit, which is not illustrated in the drawing.

The high frequency capacitor C1 that is connected in parallel between the DC power supply 1 and the high frequency power generation circuit 3 is provided. Furthermore, the battery BC that is connected in parallel between the DC power supply 1 and the high frequency power generation circuit 3 is provided. The battery BC is a solid-state battery that is surface-mounted at the circuit substrate. Furthermore, in this example, the low frequency capacitor C2 that is connected in parallel between the DC power supply 1 and the high frequency power generation circuit 3 is further provided. The low frequency capacitor C2 is, for example, a high-capacitance multilayer ceramic capacitor.

The line length WL1 between the input end of the switching circuit SC and the high frequency capacitor C1 is shorter than a line length WL3 between the input end of the switching circuit SC and the battery BC. The positional relationship of the high frequency capacitor C1 and the low frequency capacitor C2 is the same as that described in the first to fourth embodiment.

According to this embodiment, as with the high frequency power supply device described in the fifth embodiment, the power supply voltage to be applied to the high frequency power generation circuit 3 is stabilized by the battery BC. Furthermore, the voltage of the low frequency capacitor C2 is backed up by the battery BC. With these operations, the acceptable range of fluctuations in the output voltage of the power supply can be set to be narrow.

Finally, the embodiments described above are merely illustrative in all aspects and should not be recognized as being restrictive. Variations and modifications can be made by those skilled in the art in an appropriate manner. The scope of the present disclosure is defined not by the embodiments described above but by the scope of the claims. Furthermore, the scope of the present disclosure is intended to include modifications to embodiments within the scope of the claims and the equivalents thereto.

What is claimed is:

1. A high frequency power supply device configured using a circuit substrate, comprising:
   an input unit for a DC power supply;
   a high frequency power generation circuit that is connected to the DC power supply and includes a switching circuit including a high-side switch element and a low-side switch element; and
   a high frequency capacitor that is connected in parallel between the DC power supply and the high frequency power generation circuit,
   wherein
   a line length between an input end of the switching circuit and the high frequency capacitor is shorter than a line length between an output end of the DC power supply and the high frequency capacitor,
   a current path going through the switching circuit and the high frequency capacitor is the shortest among a plurality of current paths through which a switching current is caused to flow by switching at the switching circuit, and
   the high frequency capacitor is directly connected, with a shortest distance, to a connecting part of one end of the high-side switch element at the circuit substrate and a connecting part of one end of the low-side switch element at the circuit substrate.

2. A high frequency power supply device that is configured using a circuit substrate, comprising:
   an input unit for a DC power supply;
   a high frequency power generation circuit that is connected to the DC power supply and includes a switching circuit including a high-side switch element and a low-side switch element; and
   a high frequency capacitor that is connected in parallel between the DC power supply and the high frequency power generation circuit,
   wherein
   a line length between an input end of the switching circuit and the high frequency capacitor is shorter than a line length between an output end of the DC power supply and the high frequency capacitor,
   a current path going through the switching circuit and the high frequency capacitor is the shortest among a plurality of current paths through which a switching current is caused to flow by switching at the switching circuit,
   the high-side switch element and the low-side switch element are arranged at one main surface of the circuit substrate, and the high frequency capacitor is arranged at the other main surface of the circuit substrate, and
   the high frequency capacitor is directly connected, with a shortest distance, to the high-side switch element and the low-side switch element through a plurality of vias formed at the circuit substrate.

3. The high frequency power supply device according to claim 2, wherein the high frequency power generation circuit is arranged at the circuit substrate such that the switching circuit and the high frequency capacitor overlap at least partially when the circuit substrate is viewed in plan.

4. The high frequency power supply device according to claim 1, wherein the high frequency capacitor makes a ratio of time during which a voltage across the high-side switch element changes by a switching operation of the high-side switch element and a ratio of time during which a voltage across the low-side switch element changes by a switching operation of the low-side switch element the same.

5. The high frequency power supply device according to claim 1, wherein the high frequency capacitor is a multilayer ceramic capacitor made of a temperature compensation material with no Curie point.

6. The high frequency power supply device according to claim 1, wherein the high frequency capacitor is a multilayer ceramic capacitor including a dielectric made of a low-strain material having a Curie point lower than a normal temperature and exhibiting a paraelectric phase at the normal temperature.

7. The high frequency power supply device according to claim 1, further comprising:
   a low frequency capacitor that is connected in parallel between the DC power supply and the high frequency power generation circuit and has a large capacitance for low frequencies compared to the high frequency capacitor,
   wherein the line length between the input end of the switching circuit and the high frequency capacitor is shorter than a line length between the input end of the switching circuit and the low frequency capacitor.

8. The high frequency power supply device according to claim 7, wherein the high frequency capacitor has an equivalent series inductance smaller than that of the low frequency capacitor.

9. The high frequency power supply device according to claim 7, wherein the low frequency capacitor is a multilayer ceramic capacitor made of a high dielectric constant material having a Curie point higher than a normal temperature and exhibiting a ferroelectric phase at the normal temperature.

10. The high frequency power supply device according to claim 1, further comprising:
   a battery that is connected in parallel between the DC power supply and the high frequency capacitor,
   wherein the line length between the input end of the switching circuit and the high frequency capacitor is shorter than a line length between the input end of the switching circuit and the battery.

11. The high frequency power supply device according to claim 10, wherein the battery is an all-solid-state battery.

12. The high frequency power supply device according to claim 2, wherein the high frequency capacitor makes a ratio of time during which a voltage across the high-side switch element changes by a switching operation of the high-side switch element and a ratio of time during which a voltage across the low-side switch element changes by a switching operation of the low-side switch element the same.

13. The high frequency power supply device according to claim 3, wherein the high frequency capacitor makes a ratio of time during which a voltage across the high-side switch element changes by a switching operation of the high-side switch element and a ratio of time during which a voltage across the low-side switch element changes by a switching operation of the low-side switch element the same.

14. The high frequency power supply device according to claim 2, wherein the high frequency capacitor is a multilayer ceramic capacitor made of a temperature compensation material with no Curie point.

15. The high frequency power supply device according to claim 2, wherein the high frequency capacitor is a multilayer ceramic capacitor including a dielectric made of a low-strain material having a Curie point lower than a normal temperature and exhibiting a paraelectric phase at the normal temperature.

16. The high frequency power supply device according to claim 2, further comprising:
   a low frequency capacitor that is connected in parallel between the DC power supply and the high frequency power generation circuit and has a large capacitance for low frequencies compared to the high frequency capacitor,
   wherein the line length between the input end of the switching circuit and the high frequency capacitor is shorter than a line length between the input end of the switching circuit and the low frequency capacitor.

17. The high frequency power supply device according to claim 16, wherein the high frequency capacitor has an equivalent series inductance smaller than that of the low frequency capacitor.

18. The high frequency power supply device according to claim 16, wherein the low frequency capacitor is a multilayer ceramic capacitor made of a high dielectric constant material having a Curie point higher than a normal temperature and exhibiting a ferroelectric phase at the normal temperature.

19. The high frequency power supply device according to claim 2, further comprising:
   a battery that is connected in parallel between the DC power supply and the high frequency capacitor,
   wherein the line length between the input end of the switching circuit and the high frequency capacitor is shorter than a line length between the input end of the switching circuit and the battery.

20. The high frequency power supply device according to claim 19, wherein the battery is an all-solid-state battery.

\* \* \* \* \*